United States Patent [19]

Lim

[11] Patent Number: 5,125,025
[45] Date of Patent: Jun. 23, 1992

[54] METHOD FOR CONTROLLING RE-DIAL OPERATION OF A FACSIMILE SYSTEM WHEN ATTEMPTING A NON-STANDARD MESSAGE TRANSMISSION CAPABILITY

[75] Inventor: Nam-Sup Lim, Seoul, Rep. of Korea

[73] Assignee: SamSung Electronics Co., Ltd., Kyounggi, Rep. of Korea

[21] Appl. No.: 664,439

[22] Filed: Mar. 4, 1991

Related U.S. Application Data

[63] Continuation of Ser. No. 446,873, Dec. 6, 1989, abandoned.

[30] Foreign Application Priority Data

Jun. 30, 1989 [KR]  Rep. of Korea ................ 9194/1989

[51] Int. Cl.⁵ ............................................ H04M 11/00
[52] U.S. Cl. ...................................... 379/100; 358/434
[58] Field of Search .................. 379/100, 93, 98, 96, 379/97, 94; 358/400, 434, 443, 435

[56] References Cited

U.S. PATENT DOCUMENTS

| | | | |
|---|---|---|---|
| 4,748,662 | 5/1988 | Hirata | 379/100 |
| 4,807,276 | 2/1989 | Okabe | 379/100 |
| 4,815,121 | 3/1989 | Yoshida | 379/93 |
| 4,876,609 | 12/1989 | Ogura | 358/443 |
| 4,885,755 | 12/1989 | Yoshida | 379/407 |
| 4,887,162 | 12/1989 | Arai | 358/400 |
| 4,910,506 | 3/1990 | Yoshida et al. | 358/400 |

Primary Examiner—James L. Dwyer
Assistant Examiner—Ahmad F. Matar
Attorney, Agent, or Firm—Robert E. Bushnell

[57] ABSTRACT

A method for controlling re-dialing by a calling facsimile system attempting a non-standard capability facsimile operation with a called facsimile system over the public switched telephone network includes the steps of checking for reception of a non-standard facilities (NSF) command from the called facsimile system regarding a requested non-standard capability service and transmitting information to the calling facsimile system as to whether the requested non-standard capability service is executable by the called facsimile system. Upon determining from the received NSF command information that the requested service is not executable by the called facsimile system, an error flag is set by the calling facsimile system and the connection with the called facsimile system is terminated. Upon subsequent re-trying of facsimile operation by the calling facsimile system, detection of the error flag is performed for thereby preventing any re-dialing of the called facsimile system by the calling facsimile system and thus avoiding additional telephone network connection charges.

7 Claims, 6 Drawing Sheets

METHOD FOR CONTROLLING RE-DIAL OPERATION OF A FACSIMILE SYSTEM WHEN ATTEMPTING A NON-STANDARD MESSAGE TRANSMISSION CAPABILITY

This is a continuation of application Ser. No. 07/446,873, filed on Dec. 6, 1989, now abandoned.

BACKGROUND OF THE INVENTION

The present invention relates to a facsimile system and, in particular, to a re-dial control method of performing a nonstandard capability message transmission between facsimile systems.

Generally, in the case of a terminal equipment which transmits and receives a message by means of a data transmission network like a facsimile, various control information is exchanged between the elements included in a data transmission network. The control information aforementioned is called a protocol that includes control information exchanged between the terminal equipments. Relay-Request, Call Selection, Call Release, Message Transmitting and Receiving Flow Control may be a good example of the protocol.

Such rules of protocol are given in the CCITT (Comite Consultatif International Telegraphique et Telephonique) recommendation T.30.

In order to transmit a message between facsimile systems by means of the public switched telephone network (PSTN) now in use, the protocol applied in the CCITT recommendation T.30 must be satisfied. That is to say, if an exchange of the protocol is not made at an appropriate time, transmission of a message between facsimile systems may not be achieved.

"Non-standard capability" in a facsimile system which exchanges a protocol with its counterpart station in the aforesaid manner means various capability services including a Relay-Request, a Mail Box and a Transmission-Receiving (Tx-Rx) Journal Report. Such non-standard capability services as described hereinabove are usually controlled by a center (called) facsimile system. When such non-standard capability services are requested by an originator (calling) facsimile system, such services are provided by the center facsimile system. Such non-standard capability services between the originator facsimile system and center facsimile system are also performed by exchanging the protocol commands and the request for the non-standard capability services is based upon the signaling format given in the CCITT recommendation T.30.

Referring to the conventional non-standard capability services between facsimile systems, when the center facsimile system which can provide various non-standard capability services is dialed by the originator facsimile system, an on-line connection is formed between these facsimile systems. When a request is made by the originator facsimile system to the center facsimile, the center facsimile system determines if such a specific non-standard capability service as requested can be provided. In case it is possible, the center facsimile system provides the non-standard capability service to the originator facsimile.

However, the prior art facsimile system has some problem with re-dialing when the non-standard capability services are performed. That is, when a request for a specific non-standard capability service is made by the originator facsimile system to the center facsimile system, an error is committed because the called facsimile is in a condition where it does not transmit to the calling facsimile system the inexecutability of such a specific non-standard capability service as requested when it is not in a condition to provide the non-standard capability service.

On the other hand, the originator facsimile system which made a request for a specific non-standard capability service has always performed re-dialing to the extent of a previously set number, as the originator facsimile system is not provided with the requested specific non-standard capability service. Such re-dial operation is performed in the same way even if an error is committed when a non-standard capability service is performed.

Therefore, the originator facsimile system performs the redial operation continuously, nevertheless the originator facsimile system is not provided with the specific non-standard capability service. Consequently, the originator facsimile system has occupied a communication line only to be imposed an unnecessary telephone charge.

SUMMARY OF THE INVENTION

Thus, an object of the present invention is to provide a method of controlling re-dialing of a calling facsimile system by checking a requested non-standard capability service condition and by transmitting information of whether the requested service is executable or not to the calling facsimile system.

Another object of the present invention is to provide a method of controlling re-dialing by transmitting a desired specific non-standard capability service command to a called facsimile system in response to the command of the called facsimile system.

According to an aspect of the invention, the system for carrying out the method includes: a central processing unit (CPU) for controlling and processing the entire system; a memory for storing a program data, a protocol data and a character data, for accessing or storing the data; an operating panel having a number of keys; a scanner for scanning the image of a document and providing it to the CPU in the form of digital image data; a modem for modulating the output data of the CPU into analog data and outputting the input received from a calling facsimile system by demodulating it; a network control unit (NCU) for forming a communication loop with a telephone line and interfacing the signals of the modem and the telephone line; and a printer for printing out the content of the document under the control of the CPU.

According to another aspect of the invention, the method of controlling re-dial for an error of non-standard capability performance, occurring between a calling facsimile system and called facsimile system, includes:

a non-standard facilities (NSF) command transmission step for setting a non-standard capability to the NSF information field in response to a call from the calling station and transmitting the NSF command;

a service deciding step for analyzing a non-standard setup (NSS) command which is transmitted from the calling station and detecting a specific non-standard capability request information loaded in the NSS information field and then determining if said non-standard capability request information is serviceable;

a performance function information transmission step for transmitting the requested non-standard capability request information is serviceable;

a performance function information transmission step for transmitting the requested non-standard capability performing information to the calling facsimile system by setting said information to the NSF information field according to a decision made in the service deciding process;

an NSF command detection step for detecting if the NSF command exists in protocols transmitted from the called station;

a first flag setting step for setting a first flag for normal transmission and reception when there is no NSF command detected in said NSF command detection process; and a re-try deciding step for analyzing the function performing information of the NSF information of the NSF information field which is transmitted from the called side and selectively setting a first flag in the process and a re-dial prevention flag for retry prevention according to the content of the information analyzed.

BRIEF DESCRIPTION FOR THE DRAWINGS

For a better understanding of the invention and to show how the same may be carried into effect, reference will now be made, by way of example, to the accompanying diagrams and drawings, in which:

FIG. 8 is a diagram of communication made between facsimile systems according to the invention;

DETAILED DESCRIPTION OF THE PREFERRED EMBODIMENT

Now, a detailed description of the present invention will be given with reference to the drawings attached hereto.

Figure 1:
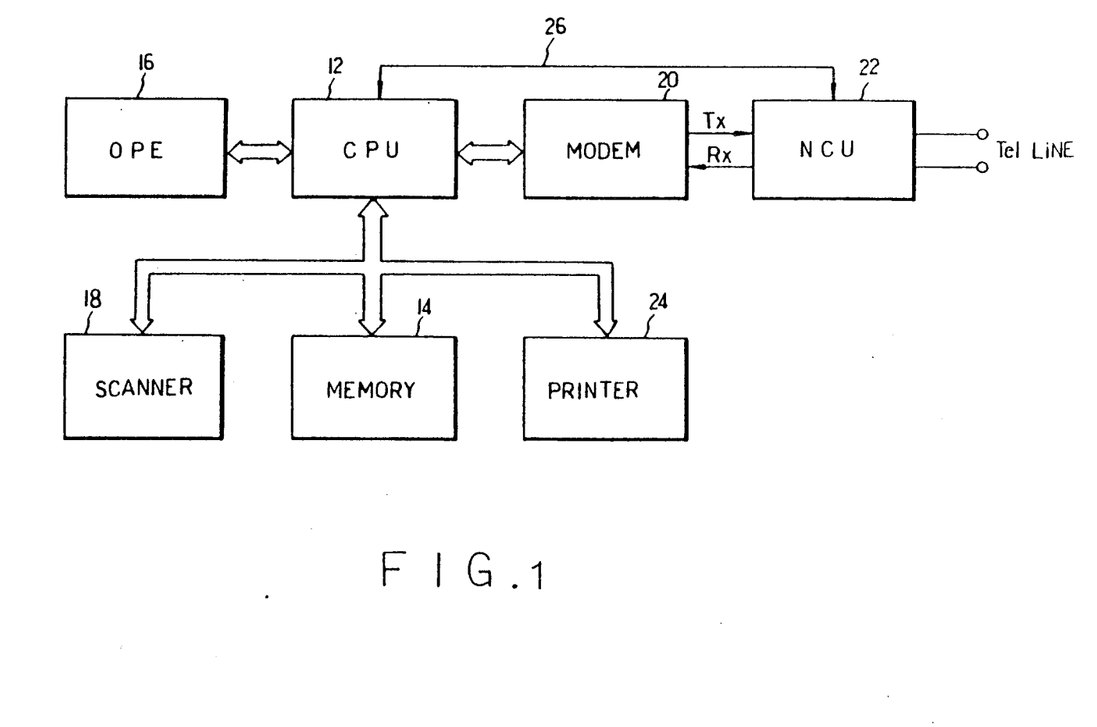
FIG. 1 is a hardware block diagram of a facsimile system for carrying out an embodiment of the invention.

Referring to FIG. 1, a CPU 12 controls and processes the entire system according to a given program. Memory 14 storing a program data, a protocol data and a character data accesses of stores the data under the control of the CPU 12. Operating panel (OPE) 16 has a number of keys by which the system is caused to produce a key data and inputs the key data to the CPU 12 when the key data is produced, and a display unit which can display the data displayed by the CPU 12. Scanner 18 scans the image of a document and provides it to the CPU 12 in the form of digital image data. Modem 20, controlled by the CPU 12, modulates the output data of the CPU 12 into analog data and outputs the input received from a calling facsimile system by demodulating it. Network control unit 22, controlled by the CPU 12, forms a communication loop with a telephone line and interfaces the signals of the modem 20 and the signals of the telephone line. In addition, a printer 24 prints out the content of the document under the control of the CPU 12.

Figure 2:
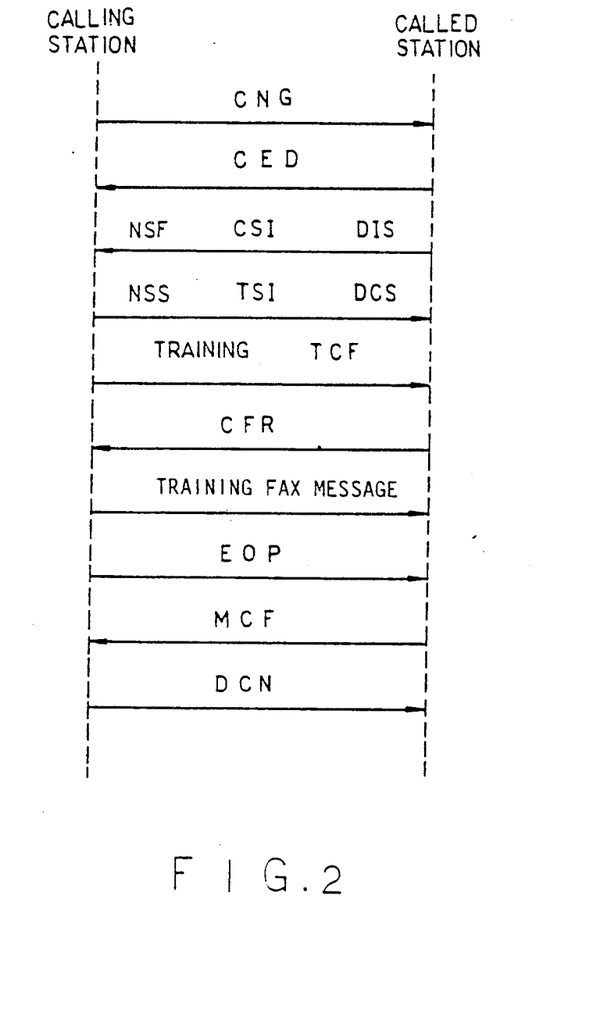

Referring to FIG. 2, there is illustrated a protocol command flowchart given in the CCITT recommendation T.30, for the communication between facsimile system. It gives an illustration showing that a message is transmitted from a calling facsimile system to a called facsimile system, as an example of automatic transmission and reception.

Figure 3:
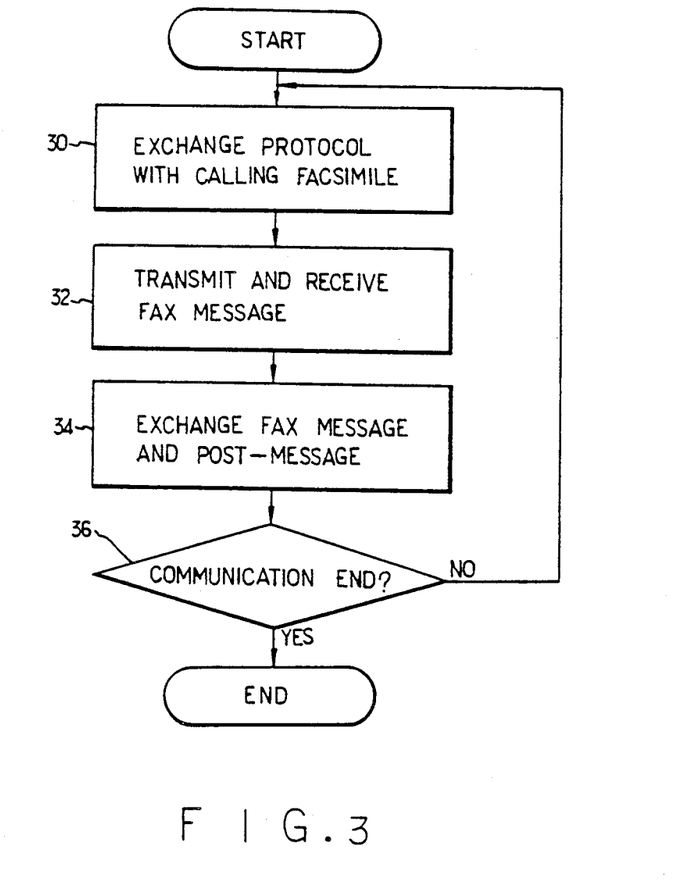
FIG. 3 is a flow chart of re-dial performance according to the present invention.

Referring further to FIG. 3, it is a flowchart of re-dial performance according to the present invention, in which an image message is transmitted and received and a pre-message protocol is communicated while a protocol is given to and received from a calling facsimile system.

Figure 4:
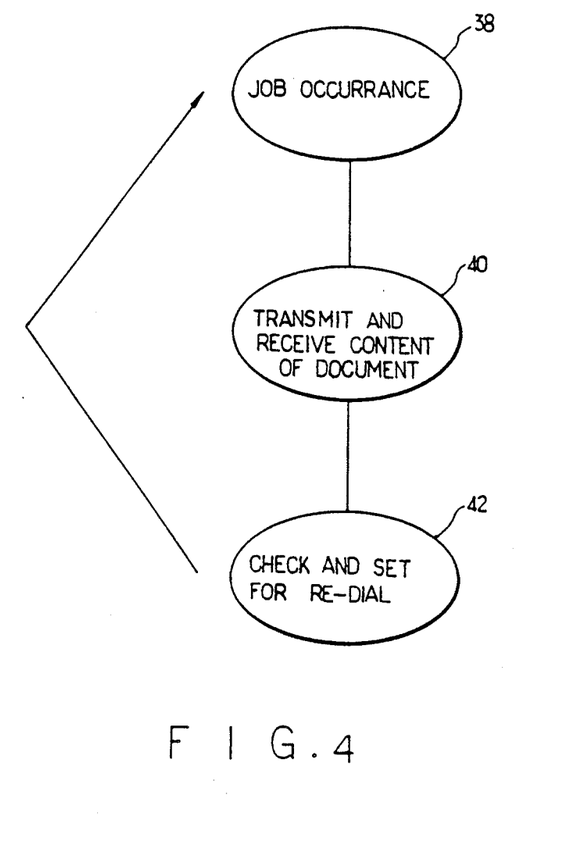
FIG. 4 is a view showing the operational phases B, C and D of a facsimile system which transmits and receives a protocol according to the present invention.

Referring to FIG. 4, there is a view showing operational states of a facsimile system which transmits and receives a protocol. When a specific request for service (job) occurs in step 38, a protocol is transmitted and received and the content of a document is transmitted and received in step 40. If an error is committed while the process of step 40 is performed, the system returns to step 38 after checking and setting for re-dialing in step 42, and repeats the same performance in step 8 as if a new job has occurred.

Figure 5:
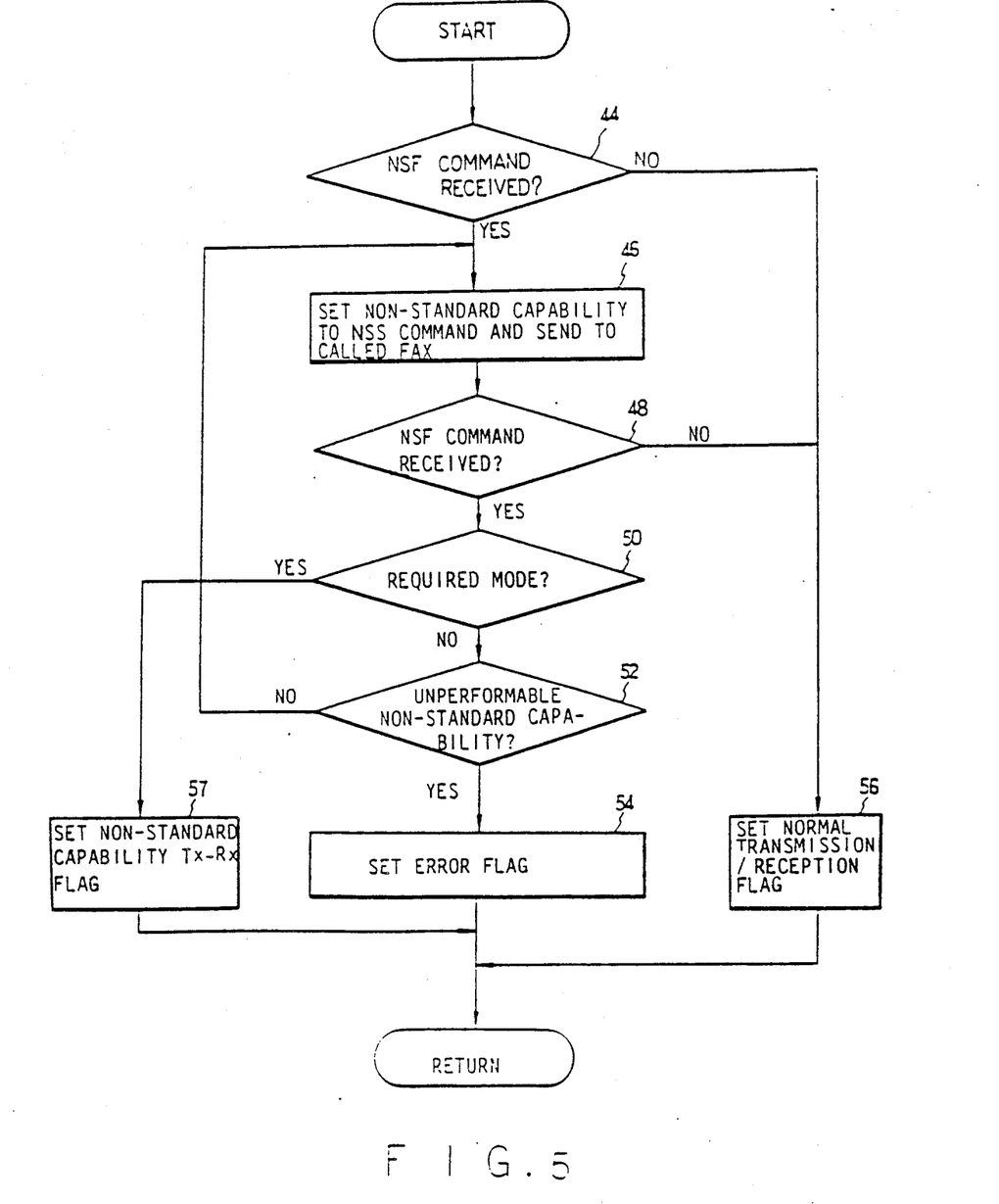
FIG. 5 is a flowchart showing the non-standard capability performance of a calling station according to the present invention.

FIG. 5 is a flowchart showing the non-standard capability service of an originator station (caller) according to the present invention. The performance flowchart is a part of a protocol transmission and reception routing which is performed after on-line connection is achieved between calling station and called station. It comprises the steps of:

detecting if an NSF command is transmitted from among the protocols transmitted from the called side;

setting a first flag for normal transmission and reception when there is no NSF command detected in the NSF command detection process; and analyzing the function performing information of an NSF information field which is transmitted from the called station and selectively setting the first flag in the above process and a redial dial prevention flag for re-try prevention according to the content analyzed.

Figure 6:
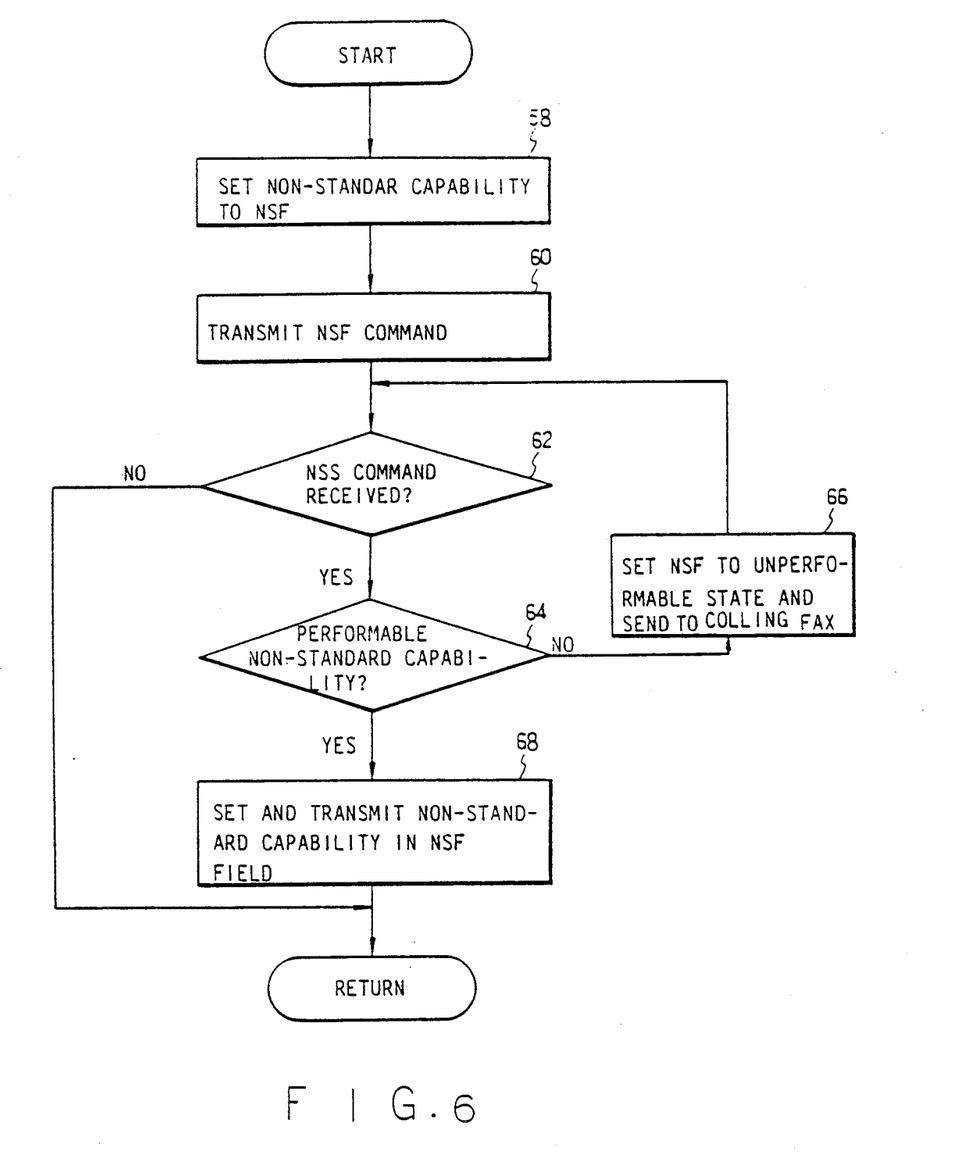
FIG. 6 is a flowchart showing the non-standard capability performance of a called station according to the present invention.

FIG. 6 is a flowchart showing the non-standard capability performance of a called station. The performance flowchart is a part of a protocol transmission and reception routine which is performed in the same manner as in FIG. 5 after on-line connection is achieved between a calling station and a called station. It includes the steps of:

setting a non-standard capability in the NSF information field in response to a call from the calling station and transmitting the NSF command to the on-line calling station;

analyzing an NSS command which is transmitted from the calling station and detecting a specific nonstandard capability request information loaded on the NSS command and then retrieving if it is serviceable; and transmitting the requested non-standard capability performing information to the calling facsimile system by setting it in the NSF information field according to the decision made in the retrieving step.

Hereinafter, an operational example of the present invention will be described with reference to the accompanying drawings described hereinabove on the assumption that a system in FIG. 1 is connected to the calling facsimile system through the PSTN (public switched telephone network) and a non-standard capability service of the Relay Request is requested by the calling facsimile system.

When a CNG (calling tone) is sent out from the calling facsimile system as illustrated in FIG. 2, it is inputted to the CPU 12 through the NCU 22 and the Modem 20. The CPU 12 receiving the CNG sends a called station identification (CED) to the calling facsimile system through the Modem 20 and NCU 22 and begins to exchange a protocol which corresponds to a pre-message with the calling facsimile system in step 30 of FIG. 3.

What is referred to as a "pre-message" above means a protocol command which is exchanged with the calling facsimile system before an image data is transmitted and received. It is also applied in the CCITT recommendation T.30.

Accordingly, in the operation of the called facsimile system as illustrated in FIG. 1, such protocols as NSF, CSI (called Subscriber Identification) and DIS (Digital Identification Signal) are sent out in the same order as shown in FIG. 2 in step 30 of FIG. 3.

At about this time, the NSF, and DIS commands are transmitted in the form of a high level data link control) frame. The called facsimile system sets an information that it retains a non-standard capability in the NSF command before the NSF command is transmitted and transmits the NSF command to the calling facsimile system in this process, in step 6Q of FIG. 6.

On the other hand, the CPU 12 of the calling facsimile system which received the CED command as illustrated in FIG. 2 detects if the NSF command of the called facsimile system is received through the NCU 22 is step 50 of FIG. 5. In the case where there if no NSF command received, the CPU of the calling facsimile system sets a normal transmission and reception flag and returns in step 6.

In the event that the NSF command transmitted from the called facsimile system is received in step 44, the CPU 12 of the calling facsimile system sets a specific non-standard capability which will receive service to the NSS command in step 46 and transmits it to the called facsimile system as illustrated in FIG. 2. In other words, the CPU of the calling facsimile system sets a relay request information to the NSS information field and transmits it.

On the other hand, the CPU 12 of the called facsimile system which transmitted an NSF command in step 60 of FIG. 6 detects if an NSS command is transmitted from the calling facsimile system in step 62. In the case where the NSS command is received, the CPU 12 of the called facsimile system analyzes the received information of the NSS information field and determines in step 64 if a corresponding non-standard capability is performable.

At this time judgement of whether a corresponding non-standard capability is performable or not can be easily carried out by consecutively comparing a requested specific non-standard capability information with a non-standard capability information stored in the non-standard capability performing table set up in the range of inner memory on the part of the called facsimile system's CPU 12.

If a requested specific non-standard capability performance service is judged possible as a result of the determination in step 64 the CPU 12 of the called facsimile system sets an information that the requested specific non-standard capability (for example, a Relay Request) is serviceable in the NSF information field in step 68 and transmits it to the calling facsimile system through modem 20 and NCU 22.

If it is judged that a requested specific non-standard capability performance is not serviceable as a result of the determination performed in the step 64, the CPU 12 of the called facsimile system sets an information that the requested specific non-standard capability is not serviceable in the NSF information field and transmits it to calling facsimile system in step 68 of FIG. 6.

Meanwhile, the CPU of the calling facsimile system which transmitted a specific non-standard capability request information by setting it in the NSS command, namely, in the NSS information field in step 46 of FIG. 5 determines if an NSF command is received in step 48 of FIG. 5. In other words, the CPU of the calling facsimile system determines if there is a response to the specific non-standard capability information requested by itself from the called facsimile system.

If it is judged that an NSF command is not received as a result of the determination in step 48, a normal transmission and reception flag is set in step 56 as described before. If, however, it is judged that an NSF command (NSF information field) is received by being transmitted from the called facsimile as a result of determination in the step 48, the CPU of the Calling facsimile system analyzes the information content of the NSF information field received and determines if there is an information present therein that the requested specific non-standard capability is performable, in step 50.

If it is determined that there is an information present that the requested specific non-standard capability is performable as a result of the decision performed in step 50, the CPU of the calling facsimile system sets in step 57 a non-standard capability transmission and reception flag set up in the inner memory and returns. When it is judged that there is no information that the requested specific non-standard capability service is performable as a result of the determination performed in step 50, the CPU of the calling facsimile system determines in step 52 if there is present an information that the requested specific non-standard capability is not performable in the NSF information field.

When it is judged that there is no information present that the requested specific non-standard capability is not performable as a result of the determination performed in step 52, the CPU of the calling facsimile system repeats operation from the step 46. When it is judged that there is an information present that the requested specific non-standard Capability is nor performable as a result of the determination performed in step 52, the CPU of the calling facsimile system sets in step 54 an error flag set up in the inner memory.

Then, the CPU of the calling facsimile system proceeds to communication termination from pre-message transmission and reception in step 30 of FIG. 3 and calls off the "Job" performance when it recognizes that an error flag is set in step 54.

The above condition is a condition changing from document content transmission and reception (step 40) in FIG. 4 to re-dial checking and setting (step 42). At this time, the CPU of the calling facsimile system detects an error flag in the memory in the re-dial checking and setting condition and does not re-try by re-dialing if it is set.

As described above, the present invention may reduce unnecessary occupation of the transmission line and its resultant telephone charge by transmitting whether the center (called) facsimile system is able to perform a requested specific non-standard capability or not to the originator facsimile system and thereby preventing re-dialing, when a request for performance of such a specific non-standard capability is made to the center facsimile system by the originator facsimile system.

What is claimed is:

1. A method for controlling re-dial operation of requester facsimile system when attempting a non-standard capability transmission comprising the steps of:

dialing a center facsimile system;

requesting a non-standard capability from said center facsimile system when said center facsimile system answers;

receiving from said center facsimile system an availability signal indicative of the availability of said non-standard capability from said center facsimile system;

setting an error flag in said requestor facsimile system for preventing said requestor facsimile system from re-dialing said center facsimile system when said availability signal indicates said non-standard capability is unavailable; and re-dialing said center facsimile system when said error flag has not been set.

2. The method for controlling re-dial operation of a requestor facsimile system when attempting a non-standard capability transmission as claimed in claim 1, wherein said step of dialing comprises:

transmitting a calling tone to said center facsimile system.

3. The method for controlling re-dial operation of a requestor facsimile system when attempting a non-standard capability transmission as claimed in claim 2, wherein said step of requesting a non-standard capability from said center facsimile system when said center facsimile system answers comprises:

receiving a called station identification signal and a high-level data link frame comprising a non-standard facilities command signal, a called subscriber identification signal and a digital identification signal from said center facsimile system, wherein said non-standard facilities command signal indicates said center facsimile system has non-standard capability;

setting a normal operations flag if said non-standard facilities command signal is not received in said high-level data link frame; and transmitting a non-standard set-up command to said central facsimile system when said non-standard facilities command signal is received in said high-level data link frame.

4. The method for controlling re-dial operation of a requestor facsimile system when attempting a non-standard capability transmission as claimed in claim 3, wherein said step of receiving from said center facsimile system an availability signal indicative of the availability of said non-standard capability from said center facsimile system comprises:

receiving as said availability signal a non-standard capability information signal from said central facsimile system, wherein said central facsimile system generates said non-standard capability signal upon reception and analysis of said non-standard set-up command;

setting a non-standard capability transmission and reception flag if said received non-standard capability information signal is indicative of said central facsimile system being able to perform said requested non-standard capability;

performing said step of setting said error flag is said received non-standard capability information signal is indicative of said central facsimile system being unable to perform said requested non-standard capability.

5. The method for controlling re-dial operation of a requestor facsimile system when attempting non-standard capability transmission as claimed in claim 4, wherein if said non-standard capability information signal from said central facsimile system is not received, further comprising the step of:

setting said normal operations flag in said requestor facsimile system.

6. The method for controlling re-dial operation of a requestor facsimile system when attempting a non-standard capability transmission as claimed in claim 4, wherein if said non-standard capability information signal from said central facsimile system is received but does not indicate whether or not said requested non-standard capability is capable of being performed, further comprising the steps of:

returning to said step of transmitting a non-standard set-up command to said central facsimile system; and repeating the method steps following said step of transmitting a non-standard set-up command to said central facsimile system.

7. A method of controlling a re-dial operation of a calling facsimile system upon occurrence of an error in attempting a non-standard facsimile capability transmission between the calling facsimile system and a called facsimile system connected therewith via a public switched telephone network, comprising:

in response to a call received by a called facsimile system from a calling facsimile system dialing said called facsimile system, detecting whether a non-standard setup command is received by said called facsimile from said calling facsimile system;

upon detecting that no non-standard setup command was received by said called facsimile system from said calling facsimile system, setting a normal transmission and reception flag in said called facsimile system;

detecting whether a non-standard facilities command is received by said calling facsimile system from said called facsimile system;

upon detecting that no non-standard facilities command was received by said calling facsimile system from said called facsimile system, setting a normal transmission and reception flag in said calling facsimile system;

upon detecting that a non-standard setup command was received by said called facsimile from said calling facsimile system, setting a non-standard facilities capability information in a non-standard facilities information field of said called facsimile system for informing said calling facsimile system that said called facsimile system retains any non-standard capability and transmitting a non-standard facilities command containing said non-standard facilities information field from the called facsimile system tot he calling facsimile system;

upon detecting that a non-standard facilities command was received by said calling facsimile system from said called facsimile system, setting a specific non-standard capability which will receive service into an information field of a non-standard setup command of said calling facsimile system and transmitting said non-standard setup command from said calling facsimile system to said called facsimile system for requesting servicing of said non-standard capability by said called facsimile system;

upon receiving said non-standard setup command from said calling facsimile system, analyzing said information field of said received non-standard setup command and determining whether any non-standard capability corresponding thereto requested by said calling facsimile system is serviceable by said called facsimile system;

upon receiving said non-standard facilities command from said called facsimile system, analyzing said information field of said non-standard facilities command received by said calling facsimile system and determining whether any non-standard capability corresponding thereto requested by said called facsimile system is serviceable by said calling facsimile system;

upon determining that any non-standard capability requested by said calling facsimile system is serviceable by said called facsimile system, setting a non-standard capability transmission and reception flag in said called facsimile system for causing said called facsimile system to perform said requested non-standard capability;

upon determining that any non-standard capability requested by said called facsimile system is serviceable by said calling facsimile system, setting a non-standard capability transmission and reception flag in said calling facsimile system for causing said calling facsimile system to perform said requested non-standard capability;

upon determining that any non-standard capability requested by said calling facsimile system is not serviceable by said called facsimile system, setting an error flag in said calling facsimile system and terminating communication with said called facsimile system; and upon re-trying further facsimile operation by said calling facsimile system, detecting whether an error flag has been set for thereby preventing any re-dialing by the calling facsimile system of the called facsimile system.

* * * * *

UNITED STATES PATENT AND TRADEMARK OFFICE
CERTIFICATE OF CORRECTION

PATENT NO. : 5,125,025
DATED : 23 June 1992
INVENTOR(S) : Nam-Sup LIM

It is certified that error appears in the above-identified patent and that said Letters Patent is hereby corrected as shown below:

Column 8, Claim 4, Line 1, change "is" to --if--.

Column 8, Claim 5, Line 7, insert --a-- after "attempting".

Column 8, Claim 7, Line 62, change "tot he" to --to the--.

Signed and Sealed this

Seventeenth Day of August, 1993

*Attest:*

*Attesting Officer*

BRUCE LEHMAN

*Commissioner of Patents and Trademarks*